April 12, 1938.   J. W. MOVIUS   2,114,083
MARKER
Original Filed June 24, 1936   2 Sheets-Sheet 2

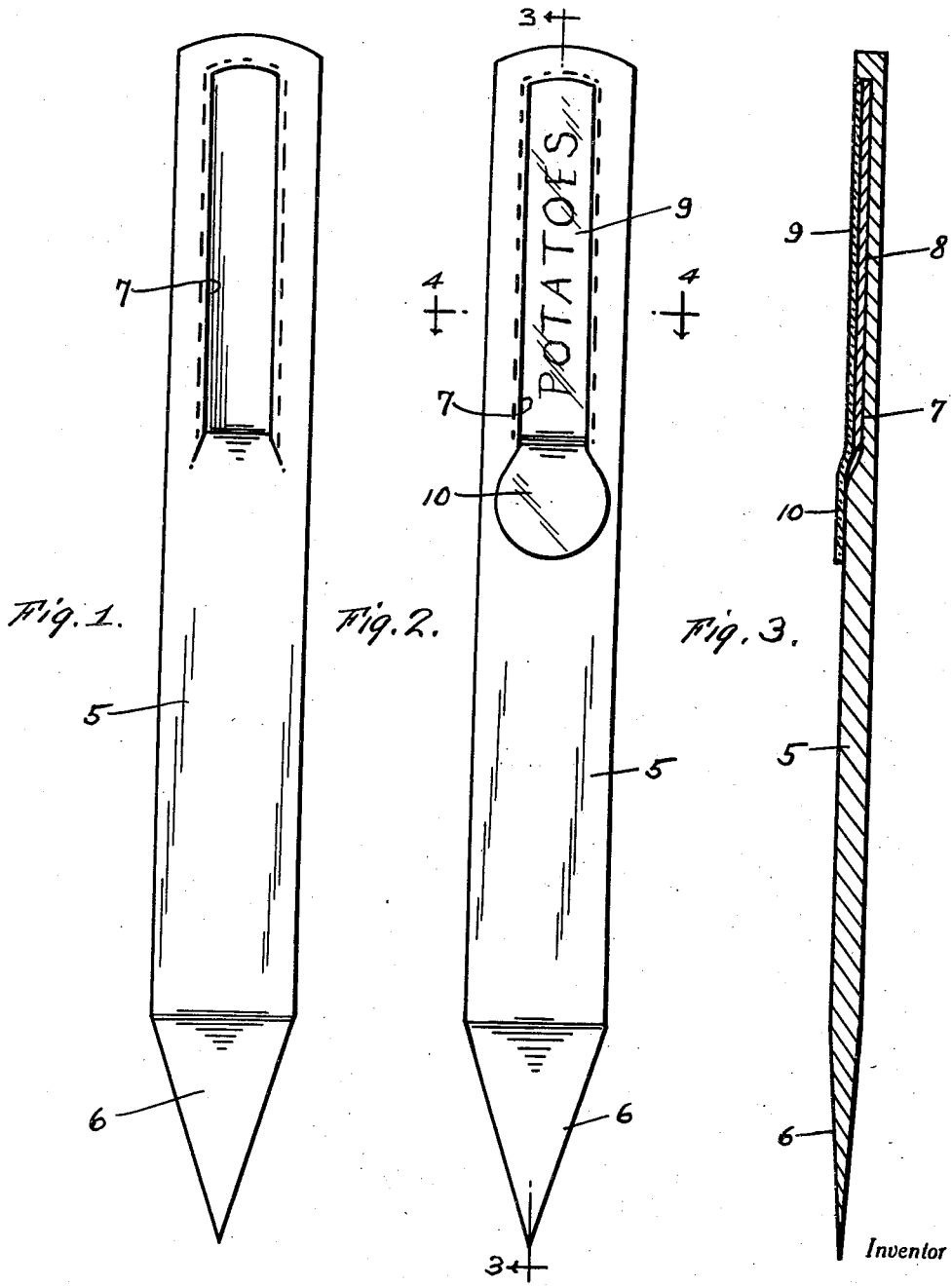

Inventor
J. W. Movius
By Clarence A. O'Brien and
Hyman Berman
Attorneys

Patented Apr. 12, 1938

2,114,083

UNITED STATES PATENT OFFICE 2,114,083

MARKER

John W. Movius, Lidgerwood, N. Dak.

Application June 24, 1936, Serial No. 87,109
Renewed March 1, 1938

2 Claims. (Cl. 40—10)

This invention appertains to new and useful improvements in markers whereby various kinds of plants, shrubbery and other growths can be identified.

An important object of the present invention is to provide a tag holder which can be either stuck in the ground or tied to a plant, the same being constructed in such a manner to be durable and resistant to weather conditions.

Other important objects and advantages of the invention will become apparent to the reader of the following specification.

In the drawings:—

Figure 1 represents a side elevational view of one form of the marker with the tag removed.

Figure 2 represents a side elevational view of the marker shown in Figure 1 with the tag and transparent strip in place.

Figure 3 is a section on the line 3—3 of Figure 2.

Figure 4:
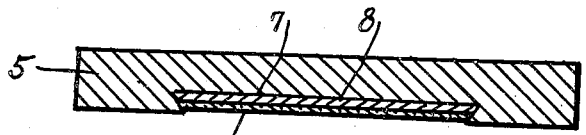
Figure 4 is an enlarged cross section on the line 4—4 of Figure 2.
Figure 5:
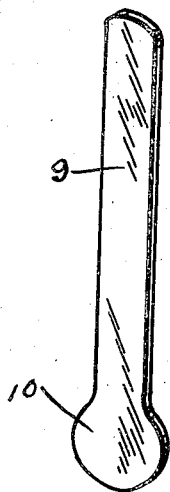
Figure 5 is a perspective view of the transparent strip.
Figure 6:
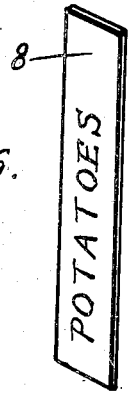
Figure 6 is a perspective view of the tag.
Figure 7:
Figure 7 is a perspective view of a modified form of the transparent strip.

Referring to the drawings wherein like numerals designate like parts, it can be seen that the form of the invention shown in Figures 1 to 3, inclusive, consists of an elongated stick 5, preferably of wood, which is pointed at one end as at 6.

The opposite end portion of the stick 5 is provided with an elongated rectangular shaped grooveway 7 having its side walls and one end wall undercut for receiving the identification tag 8 which is of opaque material and also the transparent strip 9 which is of celluloid or some other suitable transparent material. In the form of the invention shown in Figures 1 to 3, inclusive, it is preferable that the transparent strip 9 has one end enlarged as at 10 so that it can be readily gripped to permit its removal from the groove 7.

Figure 8:
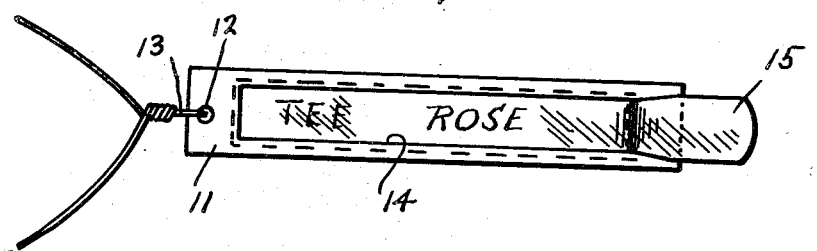
Figure 8 is a fragmentary top plan view of a slightly modified form of holder.
Figure 9:
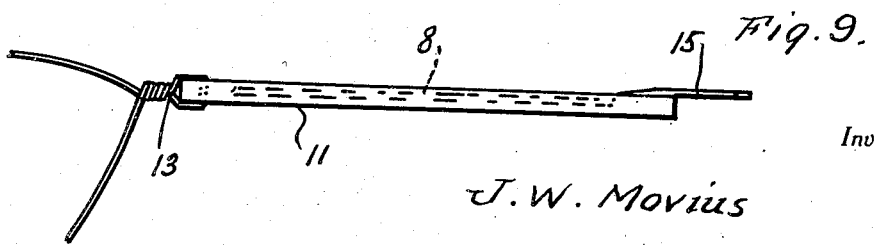
Figure 9 is an edge elevational view of the holder shown in Figure 8.

The slightly modified form of the invention shown in Figures 8 and 9, wherein the elongated block 11 of wood or some similar material is provided with an eye 12 at one end thereof through which a suitable tie element 13 can be disposed permitting the tieing of the holder to a plant, tree or the like.

This block 11 is provided with a longitudinally extending grooveway 14 opening through the opposite end of the block and having one end wall and its side walls undercut to receive the edge portions of the identification strip 8 and the transparent strip 15, which is preferably without the head 10, for in this instance one end portion of the strip 15 projects a substantial distance beyond the adjacent end of the holder 11, thus making it unnecessary to have the head 10.

While the foregoing specification sets forth the invention in specific terms, it is to be understood that numerous changes in the shape, size and materials may be resorted to without departing from the spirit and scope of the invention as claimed hereinafter.

Having described the invention what is claimed as new is:—

1. A marker of the character described comprising an elongated member provided with a groove extending longitudinally thereof, said groove having its side walls and one end wall undercut, said groove having an inlet at its opposite end, an identification tag disposed into the groove with its edge portions engaged into the undercut side walls and end wall, and a transparent strip disposed over the said identification tag with its edge portions disposed into the undercut side walls and end wall of the groove, and an enlarged finger tab at one end of the transparent strip.

2. A marker of the character described comprising an elongated body, said body being provided with an elongated depression therein, said elongated body being undercut at the side walls of the said depressed portion, an identification tag for disposition in the said depressed portion with its longitudinal edge portions disposed into the said undercut side portions of the depressed portion, one end wall of the said depressed portion being inclined from the bottom of the depressed portion to the side surface of the elongated member and against which one end of the identification tag normally abuts, and an elongated transparent cover for the said tag, said cover being disposed into the depressed portion over the tag and having its longitudinal edge portions disposed in the undercut side walls of the depressed portion, one end portion of the said cover being disposed over the inclined end portion of the depressed portion, and extending therebeyond and lying against the adjacent side of the body.

JOHN W. MOVIUS.